United States Patent [19]

Ridderstolpe et al.

[11] Patent Number: 4,952,953
[45] Date of Patent: Aug. 28, 1990

[54] CAMERA MOUNTING ARRANGEMENT

[76] Inventors: Johan Ridderstolpe, Varhagavägen 5, S-144 00 Rönninge; Johan Osterman, Linnegatan 78, S-115 23 Stockholm, both of Sweden

[21] Appl. No.: 372,590
[22] Filed: Jun. 28, 1989
[51] Int. Cl.⁵ .............................................. G03B 29/00
[52] U.S. Cl. ..................................... 354/81; 354/293; 352/243; 248/123.1; 248/178; 248/364
[58] Field of Search ................. 354/81, 293, 294, 112, 354/113; 352/243; 248/123.1, 178, 280.1, 364

[56] References Cited

U.S. PATENT DOCUMENTS 2,545,465  3/1951  Hough ................................. 354/113

Primary Examiner—Brian W. Brown
Attorney, Agent, or Firm—Sughrue, Mion, Zinn, Macpeak & Seas

[57] ABSTRACT

This invention relates to an arrangement for displacing a camera (3) along a track (1), the camera being supported by a carriage (4) which can be moved along the track. The invention eliminates the disadvantages of prior art devices in which the track is supported at both ends. According to the invention the track (1) is instead centrally supported in one point, conveniently a standard type camera stand (2). This has been made possible thanks to the fact that the combined weight of the camera (3) and the camera carriage (4) is balanced by the weight of a counterweight (6) which is positively governed for movement along the track in the opposite direction of the travel direction of the camera unit.

3 Claims, 1 Drawing Sheet

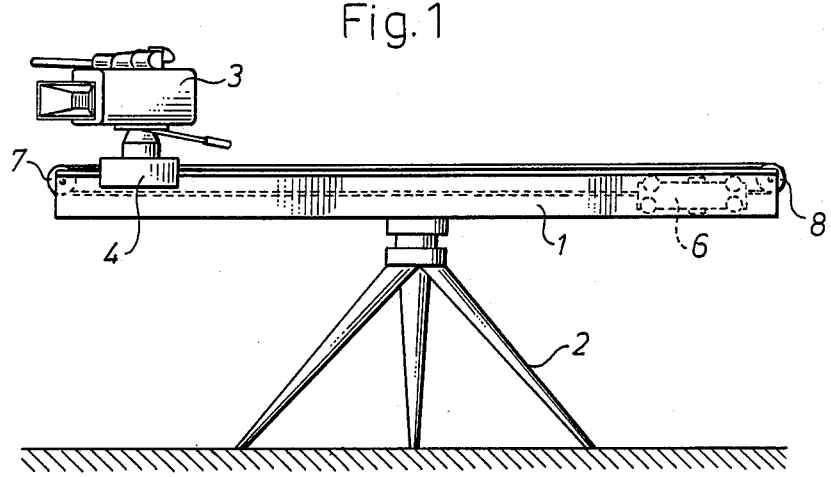
Fig. 1
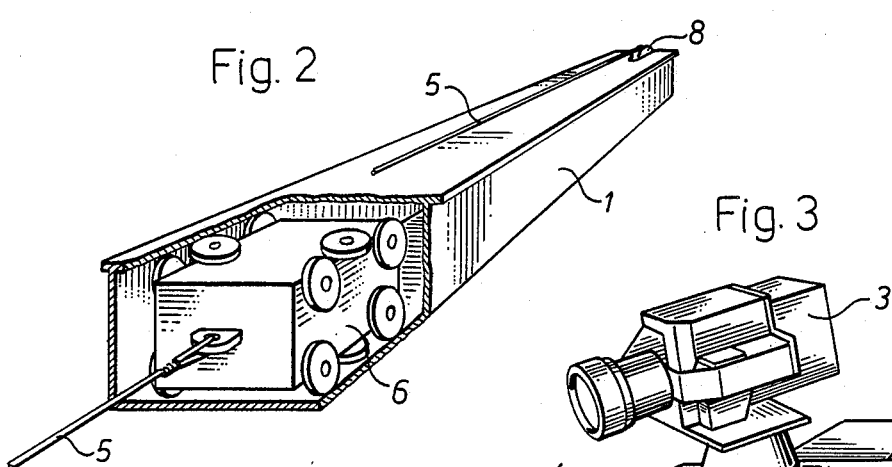
Fig. 2
Fig. 3
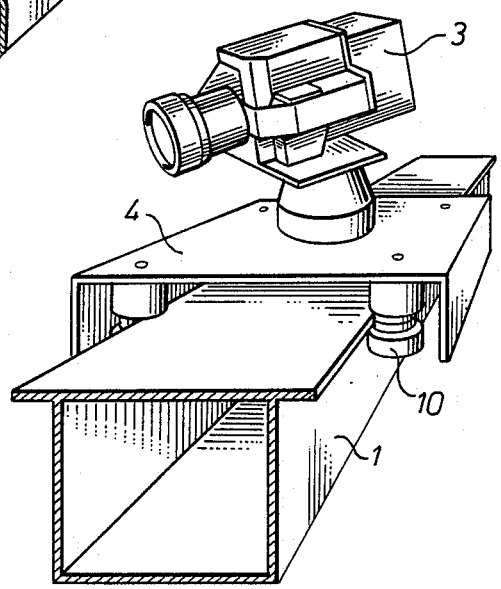

CAMERA MOUNTING ARRANGEMENT

The present invention relates to an arrangement for displacing a camera along a track, the camera being mounted on a carriage movable along the track.

The prior art includes two main types of such arrangements. The one type, widely used within the movie production industry, has a rail track resting on the ground or on some other stationary surface. According to the second type the track consists of a beam supported at its both ends.

This invention starts from devices of the last-mentioned type and has as its main purpose to increase the usefulness of such devices by making the track movable in two dimensions, rotatable and tiltable. A second object of the invention is to provide an arrangement of the type mentioned where the beam does not require any end supports. The result of the beam ends being free is that the possibilities to position the camera relatively the subject are considerably increased. Those and other objects of the invention as well as advantages accompanying it have, according to its main characteristic, been achieved in the following way. The camera carriage is in such a way connected to a counterweight, also displaceable along the track, that upon a change of the camera position relatively the center of the beam, as counted in its longitudinal direction, the counterweight is displaced in the opposite direction. The result of this arrangement is that the camera carriage and the counterweight are kept statically balanced relatively the center where the beam is mounted on a support.

One embodiment of the invention will now be described, reference being made to the accompanying drawing.

FIG. 1 does diagrammatically illustrate the principle of the invention.

FIG. 2 is a partial perspective view showing a track in the form of a box beam and illustrating one way of designing the counterweight.

FIG. 3 shows a camera carriage with rollers cooperating with flanges of the girder beam.

Reference numeral 1 designates a track in the shape of a box beam or hollow box girder housing a counterweight 6 supported by a camera stand, a so-called tripod. The beam is supported at its center, counted in the longitudinal direction. A camera 3 mounted on a carriage 4 can travel along the track 1 through cooperation between rollers 10 at flanges of the beam. The camera carriage is, by means of an endless wire 5 or the like running over pulleys 7, 8 at each of the track ends, in such a way connected with the counterweight 6 that, upon displacement of the carriage 4 in either direction, the counterweight 6 will be displaced in the opposite direction. In the embodiment shown the counterweight is likewise mounted on a carriage. The arrangement is such that in any position of the camera along the beam its distance from the beam center will be the same as that of the counterweight carriage 6. Also, the mass of the counterweight should correspond to the combined mass of the camera and the camera carriage. This arrangement means that the beam and its loads will always be maintained statically balanced independently of the position of the camera. This has in turn made it possible to replace the prior art beam end supports with a single, centrally located standard type stand, a tripod. The structure described offers great advantages in terms of the possibilities of bringing the camera in an optimum position close to the subject. The track 1 is movable in two dimensions, it can be turned around the stand 2 in a horizontal plane and it can be tilted in the vertical plane. As is understood, these two movements can be carried out simultaneously. Another important advantage is that, thanks to the fact that both ends of the beam are free, it becomes possible to put the camera in a position much closer the subject than what could be achieved according to the prior art. By way of example, a free beam end can be protruded over e.g. a table or inserted through an opening, for example a window, making it possible to film subjects at the other side of the opening.

The counterweight may consist of two or more parts which may be held together by e.g. longitudinal bolts having nuts at their ends. The number and thickness of the counterweight parts may be varied for the purpose of matching the mass of the counterweight to the sum of the masses of the camera carriage and the camera used in any given situation.

What is claimed is:

1. A camera mounting arrangement comprising an elongated track comprising a hollow box girder (1), a carriage (4) mounted externally of said box girder for movement over the full length of the box girder, a camera (3) supported on said carriage (4), a counterweight (6) interiorly of said hollow box girder, for movement internally of said hollow box girder over the length of the same, means for connecting said counterweight to said carriage, such that upon a change of camera position relative to the longitudinal center of the track, said counterweight is displaced in the opposite direction, where said camera and counterweight pass each other with the camera free to move the full distance between the ends of the track, and a vertically upright stand (2) coupled at an upper end thereof to the open box girder at its longitudinal center, whereby the assembly of said track (1), said carriage (4), said camera (3) and said counterweight (6) is maintained statically balanced relative to said longitudinal center of said track.

2. An arrangement as claimed in claim 1, in which said means for connecting said carriage (4) and said counterweight (6) comprise an endless wire (5) passing over pulleys (7, 8) at the track ends, and having portions internally of said hollow box girder connected to said counterweight and portions externally of said hollow box girder connected to opposite ends of said carriage (4).

3. An arrangement as claimed in claim 1, in which said counterweight (6) is of similar shape to said carriage, and consists of at least two separable parts permitting the parts to be varied to match the mass of the counterweight to the sum of the masses of the camera carriage (4) and the camera (3).

* * * * *